United States Patent [19]

Hilke et al.

[11] Patent Number: 5,364,490
[45] Date of Patent: Nov. 15, 1994

[54] RETREADING DEVICE FOR TIRES

[75] Inventors: Rainer Hilke; Gerhard Schmaderer, both of München, Germany

[73] Assignee: A-Z Formen- und Maschinenbau GmbH, München, Germany

[21] Appl. No.: 16,986

[22] Filed: Feb. 3, 1993

[30] Foreign Application Priority Data

Feb. 3, 1992 [DE] Germany .............................. 4203027

[51] Int. Cl.⁵ ............................................ B29D 30/54
[52] U.S. Cl. ...................................... 156/396; 156/96; 156/130; 156/130.3; 156/405.1; 156/500; 156/909
[58] Field of Search ................. 156/96, 909, 117, 111, 156/123, 128.1, 129, 130, 130.3, 394.1, 396, 397, 405.1, 406.4, 406.2, 500

[56] References Cited

U.S. PATENT DOCUMENTS

| | | | |
|---|---|---|---|
| 2,121,252 | 6/1938 | Marco | 156/405.1 |
| 3,308,000 | 3/1967 | Holman . | |
| 3,397,099 | 8/1968 | Barefoot | 156/130 |
| 3,775,220 | 11/1973 | Rattray | 156/396 |
| 4,206,009 | 6/1980 | Kazares . | |
| 4,596,617 | 6/1986 | Ishii . | |
| 4,602,972 | 7/1986 | Goodfellow | 156/396 |
| 4,891,082 | 1/1990 | Broyles et al. | 156/123 |
| 5,162,070 | 11/1992 | Meyer | 156/909 X |

FOREIGN PATENT DOCUMENTS

| | | | |
|---|---|---|---|
| 4012695 | 4/1990 | Germany . | |
| 1289698 | 2/1987 | U.S.S.R. | 156/96 |

OTHER PUBLICATIONS

AZ, "Swing Builder Type CTC-SB ®" Brochure, Jan. 1993.

*Primary Examiner*—Geoffrey L. Knable
*Attorney, Agent, or Firm*—Robert W. Becker & Associates

[57] ABSTRACT

A retreading device for tires in which a tread strip is applied to a carcass includes a tread strip feeding device for feeding the tread strip to the carcass and an extruder for the extrusion of a rubber binding layer. The device includes also an inclined lifting device for a pivotably supporting the carcass relative to the extruder and/or the tread strip feeding device.

19 Claims, 3 Drawing Sheets

RETREADING DEVICE FOR TIRES

BACKGROUND OF THE INVENTION

The present invention relates to a retreading device for tires in which a tread strip is applied to the carcass, the retreading device comprising a tread strip feeding device for feeding the tread strip to the carcass, an extruder for extruding a rubber binding layer onto the carcass, and a support for pivotably supporting the carcass relative to the extruder and/or the tread strip feeding device.

In such retreading devices it is known to extrude a rubber binding layer which provides a secure connection between the carcass and the tread strip. In this context, it is known to apply the rubber binding layer to the tread strip.

It is furthermore known from German Offenlegungsschrift 40 12 695 to apply the rubber binding layer directly to the carcass by controlling an extruder accordingly.

Furthermore, it is known from U.S. Pat. No. 3,308,000 to wind and shape a relatively thin strip in a plurality of layers. The adjustment of the winding direction and of the carcass in this method is achieved by an adjusting screw system whereby pressing rollers for the strip exiting from the extruder are pivotably supported.

However, the known retreading devices require a considerable physical strain of the operator, especially when retreading large tires such as truck tires. This is true even when the extruder itself is horizontally displaceable. Such a displaceable support requires respectively precise guiding devices for the translatory movement.

It is therefore an object of the present invention to provide a retreading device for tires of the aforementioned kind which at reduced manufacturing costs allow for a simplified operation with at least the same retreading product quality and retreading speed as conventional devices.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
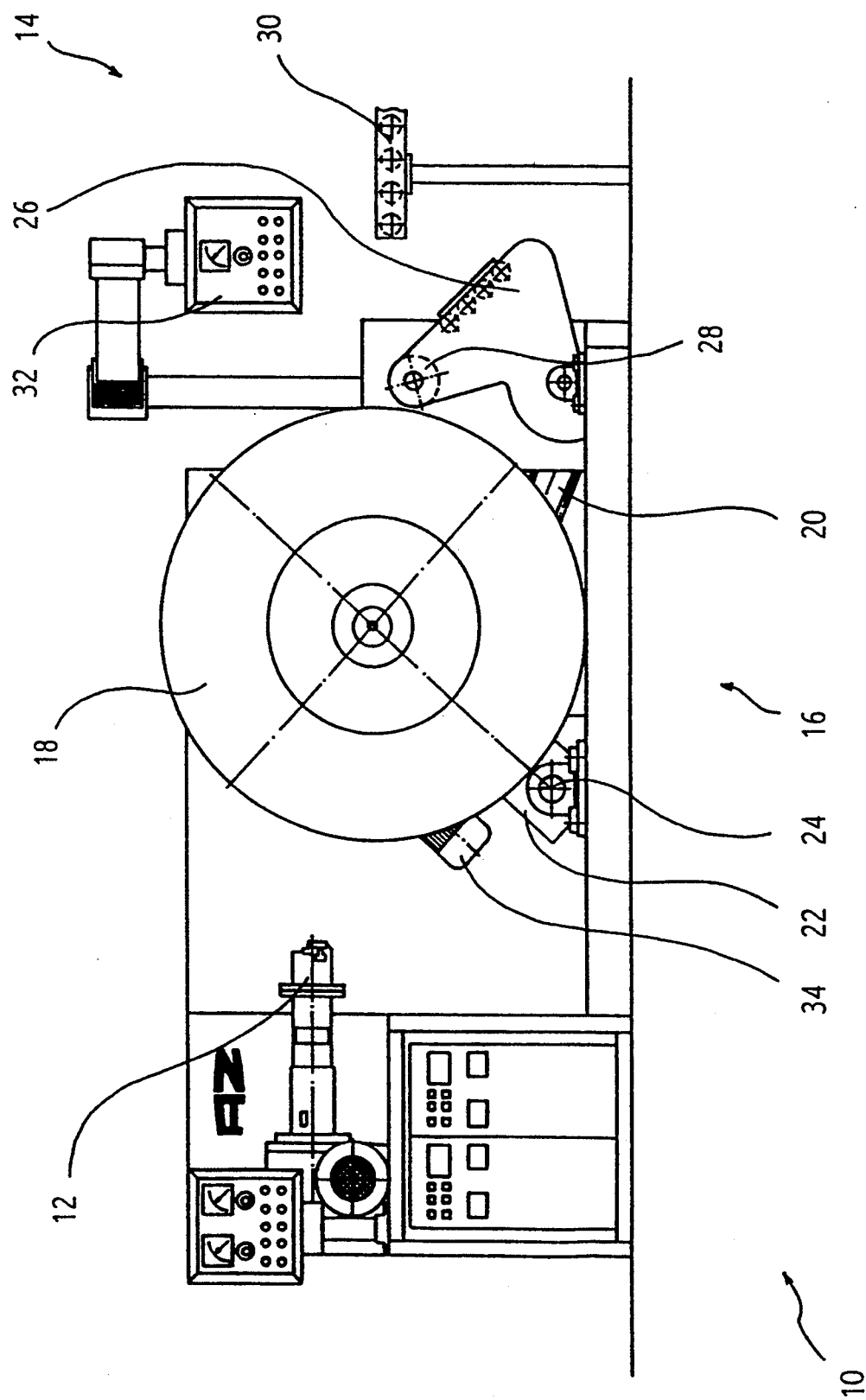
FIG. 1 is a schematic side view of an inventive retreading device in which the carcass is in a position close to the ground.

The retreading device for tires according to the present invention is primarily characterized by a tread strip feeding device for feeding the tread strip to the carcass, an extruder for extruding a rubber binding layer onto the carcass, and a support for pivotably supporting the carcass relative to the extruder and/or the tread strip feeding device, the support being an inclined lifting device.

Preferably, the inclined lifting device comprises a pivot arm and a pivot fixedly connected to the ground, the pivot arm connected to the pivot. Expediently, the pivot, relative to the inclined lifting device, is facing the extruder. Advantageously, the device further comprises a drive motor for rotating the carcass, the motor connected to the pivot arm.

In another embodiment of the present invention, the inclined lifting device is pivotable between a first position, in which the carcass is adjacent to the extruder for applying the rubber binding layer, and a second position, in which the carcass can be loaded on and removed from the inclined lifting device. Expediently, the inclined lifting device is pivotable between the first position and a third position in which the tread strip is applied to the carcass. Advantageously, the third position is between the second position and the first position, the retreading device further comprising an abutment for arresting the inclined lifting device in the third position. Preferably, the device further comprises a pivotable tread strip pressing device, wherein the abutment is formed by the tread strip pressing device. The tread strip pressing device, with which the tread strip is pressed against the carcass having applied thereto the rubber binding layer, comprises a pressing roller.

Advantageously, the tread strip pressing device further comprises a guiding path for the tread strip, the guiding path arranged before the pressing roller in the feeding direction of the tread strip.

The weight of the carcass and the inclined lifting device in the third position are in part supported at the pressing roller. The weight of the carcass is in part supported by a hub of the carcass and in part by the pressing roller. Preferably, the pressing roller supports essentially 50% of the weight of the carcass. It is also possible that the pressing roller supports more than 50% of the weight of the carcass.

The inclined lifting device further comprises an actuating device and the weight of the carcass supported by the pressing roller is adjustable by the actuating device. Preferably, the actuating device is a spindle-type displacing device arranged within the area of the tread strip pressing device.

The tread strip pressing device is a plate lever pivotable between end positions only when the inclined lifting device is in the first position.

A lower end position of the tread strip pressing device provides an abutment for the tread strip pressing device at the ground.

In the second position the carcass touches the ground in a balanced fashion, i.e., without supporting the weight of the carcass on the ground, and the inclined lifting device is pivotable about an angle of less than 90° relative to the second position.

The translatory movement of the inclined lifting device in the horizontal direction and the translatory movement of the inclined lifting device in the vertical direction are combined into an arc-shaped pivoting movement, wherein the extent of the arc-shaped pivoting movement is substantially smaller than the diameter of the carcass.

The device preferably further comprises a separate foldable pressing device with which after the application of the tread strip wings can be pressed onto the carcass.

The inventive retreading device for tires in a simple manner provides the possibility of adjusting for size differences of different carcasses. With the inventive inclined lifting device the carcass can always be displaced from a loading position close to the ground into a position close to the extruder in which the rubber binding layer is applied, whereby the desired vertical alignment between the extruder nozzle and the carcass surface is always ensured.

For this purpose, in the embodiment in which the inclined lifting device is in the form of a pivot arm it is only necessary to select the pivot point of the pivot arm such that only minimal angular deviations between the extrusion direction and the radial direction of the carcass will result. When embodying the inclined lifting device in the form of a slanted plane, this can also be ensured by respectively selecting the slant of the plane.

It is especially advantageous that the elevating platforms used in the prior art for the positioning of the carcass at the desired level of the retreading device for clamping the carcass have been eliminated with the present invention. With the inventive device it is possible to remove the carcass from the retreading device in a position close to the ground, while for the clamping of the carcass a farther downwardly displaced position is used.

It is also advantageous that with the inventive inclined lifting device it is now possible to apply the tread strip in an intermediate position. For this purpose, a plate lever provided at the side of the retreading device remote from the extruder is simply moved into the area of movement of the carcass with the aid of a pressing roller. The carcass is then supported at the pressing roller, whereby the plate lever provides an abutment.

The pressing force can be increased or decreased by predetermined advancing steps of a corresponding spindle-type displacing device. Optionally, the pressing force can be determined by a sensor.

The pivotable attachment of the pressing roller on the plate lever allows for a fast retreading operation by combining the various steps in a continuous process: In a first position close to the extruder the rubber binding layer is applied, the pressing roller is then folded inwardly and the carcass is subsequently lowered onto the pressing roller so that the tread strip can be applied and pressed onto the carcass, the carcass is then slightly lifted in order to bring the pressing roller into the outwardly folded position and then again lowering the carcass in order to allow the removal of the retreaded carcass. Optionally, when applying tread strips with wings, after applying the tread strip a pressing of the wings can be performed by providing a separate foldable pressing device that is folded outwardly after completion of the pressing step so that the carcass can be lowered and removed.

It is understood that in an advantageous embodiment the plate lever may be provided with a plurality of guiding rollers for feeding the tread strip, as is known from conventional tread strip feeding devices. The guiding rollers may also be arranged upstream of the plate lever.

The inward folding of the pressing roller which, according to a preferred embodiment of the present invention, is connected to the plate lever, can automatically start the feeding of the tread strip, while a rotation of the carcass about 360° provides the signal for the termination of the feeding process of the tread strip.

It is understood that instead of the plate lever another translatory support of the pressing roller is possible, whereby for the selection of the respective path of movement of the pressing roller respective application requirements, tire sizes and different techniques can be taken into consideration.

It is also possible to employ instead of the aforedescribed advantageous CTC (cushion to casing) method a CTT (cushion to tread) method. When employing the latter method, the advantage of applying in a continuous process the rubber binding layer onto the carcass is lost. However, with the inventive inclined lifting device and the pivoting support of the pressing roller the required lifting and lowering of the carcass with the desired pressing force can be favorably realized.

The slant of the path of movement of the inventive inclined lifting device can in one extreme be at a 90° angle to the horizontal, for example, if this is necessary due to given space limitations.

DESCRIPTION OF PREFERRED EMBODIMENTS

The present invention will now be described in detail with the aid of several specific embodiments utilizing FIGS. 1 through 3.

The inventive retreading device 10 is comprised of an extruder 12, a tread strip feeding device 14, and a support 16 for a carcass 18. The support is inventively designed as an inclined lifting device 16 and comprises an actuating device 20 that, as can be seen in FIG. 2, is embodied as a spindle-type displacing device (gear) and further comprises a pivot arm 22.

The pivot arm 22 is supported at the frame of the retreading device 10 at a stable pivot 24 and is provided at its free end with a clamping device for the hub of the carcass 18, which is covered in the representation of the drawings by the carcass 18. The actuation device 20 comprises a spindle-type displacing device with an electronically controllable drive and serves to actuate the inclined lifting device 16 for displacing the carcass 18 into a desired position.

In the inventive embodiment of FIG. 1, the tread strip feeding device 14 further comprises a pivotably supported plate lever 26 which carries a pressing roller 28. In the position represented in FIG. 1, the plate lever 26 is in its outwardly folded position, i.e., the pressing roller 28 is outside of the area of movement of the carcass 18.

Between the two movably supported plate levers 26, a wings pressing device is provided which is pivotably supported on the axle of the pressing roller 28. The wings pressing device in the drawings is covered by the plate lever 26 and therefore not represented in detail.

Figure 3:
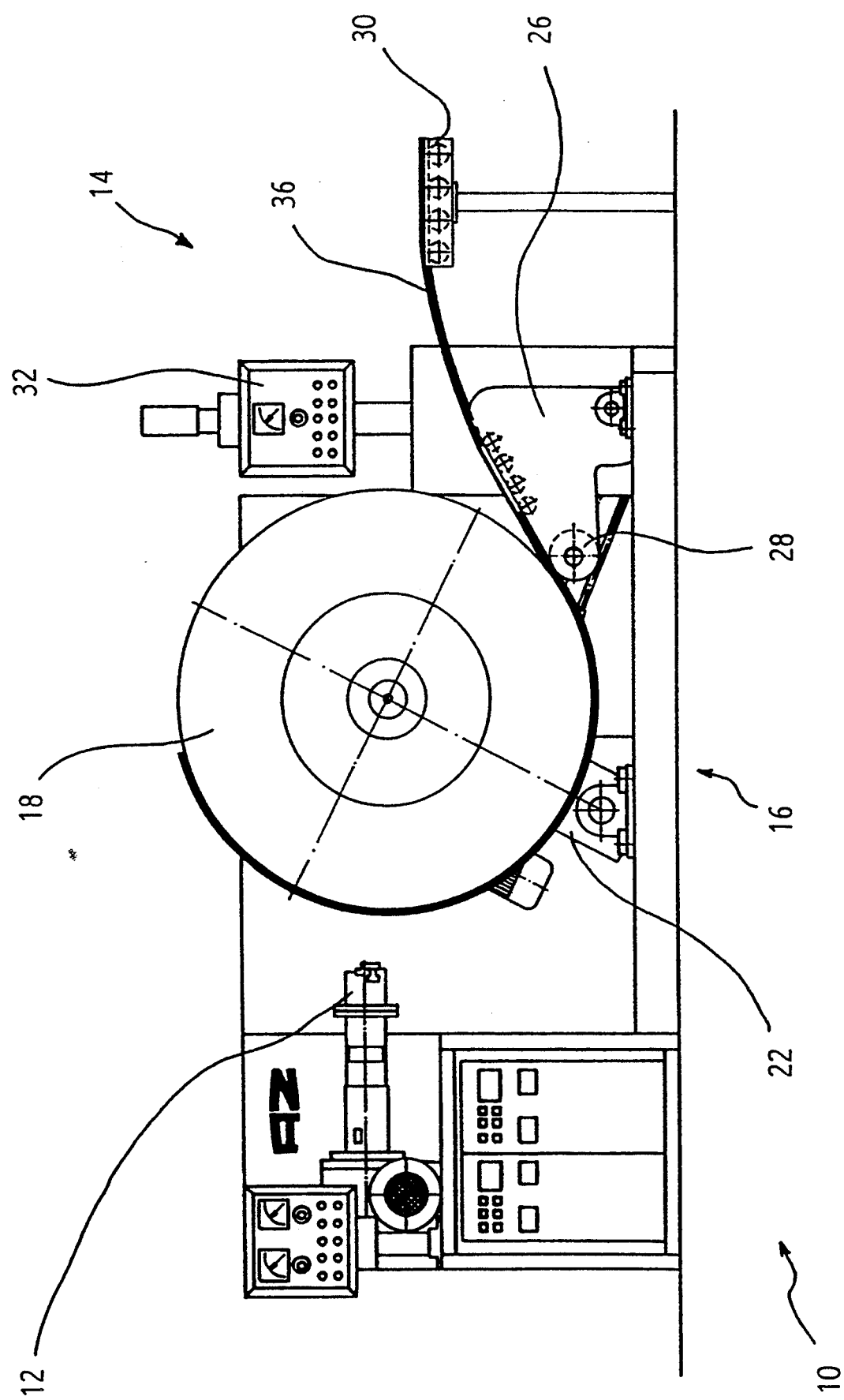
FIG. 3 shows the embodiment of FIG. 1 with the tread strip being applied.

The tread strip feeding device 14 further comprises a stationary roller conveyor 30 via which a tread strip, as can be seen in FIG. 3, is supplied to the retreading device.

In the represented embodiment a control unit 32 for controlling the retreading operation is provided which is also laterally pivotably supported in order to be removable from the area of movement of the carcass 18.

Figure 2:
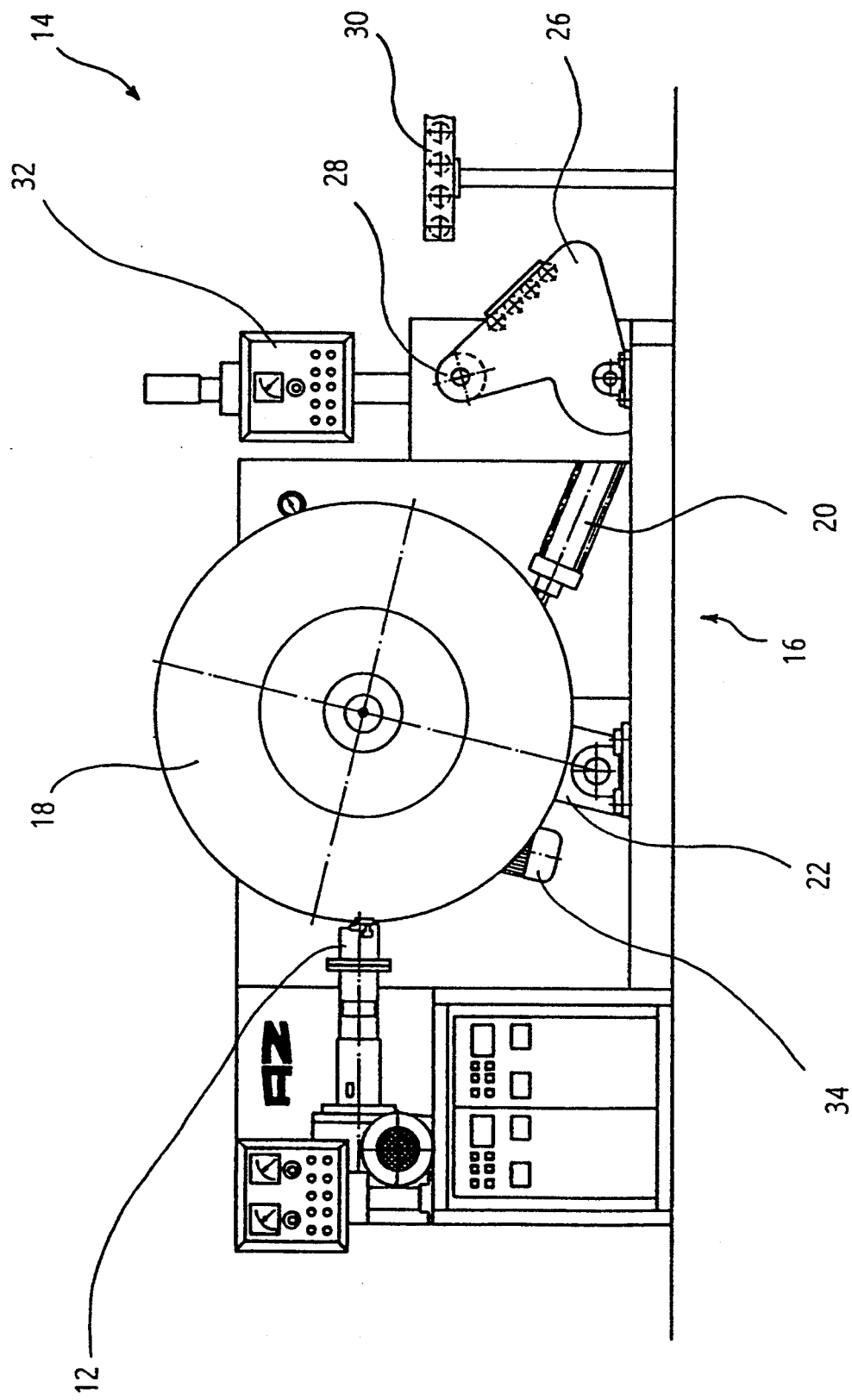
FIG. 2 shows the embodiment according to FIG. 1 whereby the carcass is in a position adjacent to the extruder.

In FIG. 2 it is shown that the carcass 18 is pivotable by the inclined lifting device 16, respectively, by the actuating device 20 into a position close to the extruder in which the rubber binding layer is applied to the carcass. In this position, the extrusion direction is essentially radial to the carcass 18, and the carcass 18 is rotated by a motor 34 about 360° in order to ensure the application of the rubber binding layer in the desired manner.

While in the loading position the pivoting angle of the pivot arm 22 relative to the horizontal is approximately 48°, in the position close to the extruder according to FIG. 2 this angle is 77°. When a carcass of a smaller diameter is to be retreaded, the first value decrease and the second value increases correspondingly. However, an essentially radial application of the rubber binding layer with the extruder 12 is ensured because the pivot point of the pivot arm 22 has been selected accordingly.

During the extrusion of the binding rubber layer, the plate lever 26 is moved into the inwardly folded position represented in FIG. 3. The plate lever 26 is provided for this purpose with a respective abutment at the frame of the retreading device 10, whereby the abutment allows the plate lever 26 in the inwardly folded position to support the weight of the carcass 18.

After the application of the rubber binding layer the carcass 18 is pivoted into the position shown in FIG. 3 via the actuating device 20. In this position, the carcass is supported with its outer circumference at the pressing roller 28 so that the tread strip now fed to the carcass 18 is pressed onto the carcass 18. The pressing force is adjustable with the actuating device 20 in the desired manner.

In this position, the carcass 18 is again rotated by 360°. The pivoting position of the pivot arm 22 in the shown embodiment is 63° relative to the horizontal.

In order to provide for a smooth retreading operation, it is suggested that the feeding of the tread strip 36 is timely started such that the tread strip 36 is already within the area of the plate lever 26 when the carcass 18 is pivoted into the position shown in FIG. 3. After completion of the application of the rubber binding layer the carcass 18 can be further rotated so that the application of the tread strip begins immediately when the pressing roller 28 is provided with the desired pressing force.

Immediately after completion of the application of the tread strip the tread strip is pressed onto the carcass. In this process step, the carcass 18 is rotated at about four times the speed at which the tread strip is applied. By using individual advancing steps of the spindle-type lifting device of the actuating device 20 the carcass 18 is pressed against the pressing roller 28. After completion of the pressing step, the actuating device 20 is removed and the plate lever 26 is returned into the outwardly folded position.

When applying tread strips with wings, a separate wing suppressing device is folded inwardly after the pressing step of the tread strip. The wings pressing device is pivotably supported at the axle of the pressing roller 28. Via the actuating device 20 the carcass 18 is downwardly pivoted toward the pressing rollers for the wings.

Immediately after completion of the wings pressing step the carcass 18 can be lifted by the actuating device 20 in order to return the wings pressing device into the outwardly folded position.

In this position the carcass 18 can then be lowered into a position close to the ground, shown in FIG. 1, and the retreaded carcass can be removed from the device in order to complete the retreading process by heating the retreaded carcass in a steam container in a manner known per se.

The present invention is, of course, in no way restricted to the specific disclosure of the specification and drawings, but also encompasses any modifications within the scope of the appended claims.

What we claim is:

1. A retreading device for tires, in which a tread strip is applied to a carcass, said retreading device comprising:
   a tread strip feeding device for feeding the tread strip to the carcass;
   an extruder for extruding a rubber binding layer onto the carcass;
   a support for displaceably supporting the carcass relative to said extruder and said tread strip feeding device, said support being an inclined lifting device for moving said carcass between said tread strip feeding device and said extruder;
   said inclined lifting device comprising a pivot arm and a pivot fixedly connected to the ground, the pivot arm connected to said pivot; and
   wherein said pivot, when viewing said retreading device in a plan view, is located between said extruder and a center of the carcass in any carcass position.

2. A retreading device according to claim 1, further comprising a drive motor for rotating the carcass, said motor connected to said pivot arm.

3. A retreading device for tires according to claim 1, wherein said inclined lifting device is pivotable between a first position, in which the carcass is adjacent to said extruder for applying the rubber binding layer, a second position, in which the carcass can be loaded on and removed from said inclined lifting device, and a third position in which the tread strip is applied to the carcass.

4. A retreading device according to claim 3, wherein said third position is between said second position and said first position, said retreading device further comprising an abutment for arresting said inclined lifting device in said third position.

5. A retreading device according to claim 4, further comprising a pivotable tread strip pressing device, with which the tread strip is pressed against the carcass having applied thereto the rubber binding layer, wherein said abutment is formed by said tread strip pressing device.

6. A retreading device according to claim 3, wherein in said second position the carcass touches the ground without supporting a weight of the carcass on the ground and wherein said inclined lifting device is pivotable about an angle of less than 90° relative to said second position.

7. A retreading device according to claim 1, wherein a translatory movement of said inclined lifting device in the horizontal direction and a translatory movement of said inclined lifting device in the vertical direction are combined into an arc-shaped pivoting movement, wherein the extent of said arc-shaped pivoting movement is substantially smaller than the diameter of the carcass.

8. A retreading device according to claim 1, further comprising a separate foldable pressing device with which, after the application of the tread strip, a wing can be pressed onto the carcass.

9. A retreading device for tires, in which a tread strip is applied to a carcass, said retreading device comprising:
   a tread strip feeding device for feeding the tread strip to the carcass;
   an extruder for extruding a rubber binding layer onto the carcass;
   a support for displaceably supporting the carcass relative to said extruder and said tread strip feeding device, said support being an inclined lifting device for moving said carcass between said tread strip feeding device and said extruder, said inclined lifting device pivotable between a first position, in which the carcass is adjacent to said extruder for applying the rubber binding layer, and a second position, in which the carcass can be loaded on and removed from said inclined lifting device, and further pivotable between said first position and a third position in which the tread strip is applied to the carcass, said third position between said second position and said first position;

said inclined lifting device comprising a pivot arm and a pivot fixedly connected to the ground, the pivot arm connected to said pivot; and an abutment for arresting said inclined lifting device in said third position; and a pivotable tread strip pressing device, with which the tread strip is pressed against the carcass having applied thereto the rubber binding layer, wherein said abutment is formed by said tread strip pressing device.

10. A retreading device according to claim 9, wherein said tread strip pressing device comprises a pressing roller.

11. A retreading device according to claim 10, wherein said tread strip pressing device further comprises a guiding path for the tread strip, said guiding path arranged before said pressing roller in the feeding direction of the tread strip.

12. A retreading device according to claim 10, wherein the weight of the carcass and said inclined lifting device in said third position are in part supported at said pressing roller.

13. A retreading device according to claim 10, wherein the weight of the carcass is in part supported by a hub of the carcass and in part by said pressing roller.

14. A retreading device according to claim 13, wherein said pressing roller supports essentially 50% of the weight of the carcass.

15. A retreading device according to claim 13, wherein said pressing roller supports more than 50% of the weight of the carcass.

16. A retreading device according to claim 13, wherein said inclined lifting device further comprises an actuating device and wherein the weight of the carcass supported by said pressing roller is adjustable by said actuating device.

17. A retreading device according to claim 16, wherein said actuating device is a displacing device comprising a spindle for achieving a displacing action, said displacing device arranged within the area of said tread strip pressing device.

18. A retreading device according to claim 9, wherein said tread strip pressing device is a plate lever pivotable between end positions only when said inclined lifting device is in said first position.

19. A retreading device according to claim 9, wherein a lower end position of said tread strip pressing device provides an abutment for said tread strip pressing device at the ground.

* * * * *